United States Patent [19]

Davenport et al.

[11] Patent Number: 5,058,985
[45] Date of Patent: Oct. 22, 1991

[54] COUPLING MEANS BETWEEN A LIGHT SOURCE AND A BUNDLE OF OPTICAL FIBERS AND METHOD OF MAKING SUCH COUPLING MEANS

[75] Inventors: John M. Davenport, Lyndurst; William W. Finch, University Heights; Richard L. Hansler, Pepper Pike, all of Ohio; John L. Henkes, Latham, N.Y.; Jeffrey D. Johnson, Mentor, Ohio

[73] Assignee: General Electric Company, Schenectady, N.Y.

[21] Appl. No.: 556,134

[22] Filed: Jul. 23, 1990

[51] Int. Cl.$^5$ .................. G02B 6/04; G02B 6/26; F21V 7/04
[52] U.S. Cl. ..................... 385/115; 385/86; 385/901; 362/32
[58] Field of Search ............... 350/96.10, 96.15, 96.20, 350/96.22, 96.23, 96.24, 96.25, 96.27, 96.28, 320; 362/32

[56] References Cited

U.S. PATENT DOCUMENTS

| | | | |
|---|---|---|---|
| 3,721,815 | 3/1973 | Wall | 362/32 |
| 3,933,455 | 1/1976 | Chown | 350/96.22 |
| 4,116,655 | 9/1978 | Lewis | 350/96.22 |
| 4,127,319 | 11/1978 | Forney, Jr. et al. | 350/96.20 |
| 4,662,714 | 5/1987 | Mori | 350/96.20 |
| 4,698,084 | 10/1987 | Severijns et al. | 350/96.22 |
| 4,743,082 | 5/1988 | Mori | 350/96.10 |
| 4,758,064 | 7/1988 | Neefe | 350/96.23 |
| 4,811,172 | 3/1989 | Davenport et al. | 362/61 |
| 4,850,669 | 7/1989 | Welker et al. | 350/96.20 |
| 4,887,190 | 12/1989 | Sadamune et al. | 362/32 |
| 4,997,259 | 3/1991 | Ichimura et al. | 350/96.24 |
| 5,013,128 | 5/1991 | Stern et al. | 350/96.24 |

OTHER PUBLICATIONS

Book by N. S. Kapany entitled "Fiber Optics-Principles and Applications", published in 1967 by Academic Press, New York, NY (pp. 168-169).

Primary Examiner—Brian Healy
Attorney, Agent, or Firm—George E. Hawranko; Stanley C. Corwin; Fred Jacob

[57] ABSTRACT

This coupling means comprises a sleeve containing a bore in which is located a bundle of optical fibers, at least some of which are of compression-deformable material. The input ends of the fibers, which receive light from a light source, are located in a predetermined plane. The bore tapers from a relatively large diameter at a location in a second plane spaced from said predetermined plane to a relatively small diameter at said predetermined plane. The tapered bore is of such a size that the optical fibers therein are laterally compressed and the compression-deformable fibers are so deformed in transverse cross-section relative to their normal cross-sections that the fibers more completely fill the bore in its relatively small diameter region than in said second plane.

17 Claims, 4 Drawing Sheets

COUPLING MEANS BETWEEN A LIGHT SOURCE AND A BUNDLE OF OPTICAL FIBERS AND METHOD OF MAKING SUCH COUPLING MEANS

CROSS-REFERENCE TO RELATED PATENT

This application is related to the subject matter disclosed and claimed in U.S. Pat. No. 4,811,172-Davenport and Hansler, assigned to the assignee of the present invention, which patent is incorporated by reference in the present application.

TECHNICAL FIELD

This invention relates to a lighting subsystem that comprises a light source and a bundle of optical fibers for transmitting light from the source and, more particularly, relates to coupling means for coupling light from the source into the input ends of the fibers with reduced loss of light.

BACKGROUND

A known type of lighting system, which is exemplified by the system disclosed in the aforesaid U.S. Pat. No. 4,811,722 - Davenport et al, comprises a bundle of optical fibers each having an input end, a light source, and a reflector for receiving light from the source and reflecting such light from the source into the input ends of the optical fibers for transmission by the fibers. It is desirable in such a system that light from the source be coupled into the optical fibers with the least possible loss of light. One factor that can result in undesired losses is the presence of voids between the optical fibers in the bundle. Any light from the source entering these voids represents lost light which is not transmitted by the optical fibers.

OBJECTS

An object of our invention is to provide, between the light source and the input end of a bundle of optical fibers, coupling means that is capable of reducing the losses resulting from light from the source entering the usual voids between the fibers at the input end of the bundle.

Another object is to provide a simple and easily practiced method for making such coupling means.

SUMMARY

In carrying our invention in one form, we provide a bundle of optical fibers each having an input end for receiving light from a light source, the input ends of the fibers being located in a predetermined plane. At least some of the fibers are of compression-deformable material, and each of these latter fibers has a normal transverse cross-section when in an uncompressed state. Positioned about the bundle adjacent said predetermined plane is a coupling device comprising a sleeve containing a bore receiving the bundle. This bore tapers from a relatively large diameter at a location spaced from said predetermined plane to a relatively small diameter at said predetermined plane. The bore in a second plane parallel to and spaced from said predetermined plane has a circumference just large enough to surround the bundle without laterally compressing the fibers in said second plane. The tapered bore is of such a size that the optical fibers therein are laterally compressed, and the compression-deformable fibers are so deformed in transverse cross-section relative to their normal transverse cross-sections that the optical fibers more completely fill said bore in the relatively small diameter region of the bore than in said second plane.

In one embodiment of the invention, all of the optical fibers within the bore are of compression-deformable material. In another embodiment, some of the optical fibers present within the bore are of compression-deformable material and others are relatively undeformed by the compressive forces developed within the coupling device. The compression-deformable fibers in said predetermined plane more fully envelope the relatively undeformed fibers and leave a much smaller percentage of the bore cross-section void in said predetermined plane than is the case in said second plane.

BRIEF DESCRIPTION OF DRAWINGS

For a better understanding of the invention, reference may be had to the following detailed description taken in connection with the accompanying drawings, wherein.

DETAILED DESCRIPTION OF EMBODIMENTS

Figure 1:
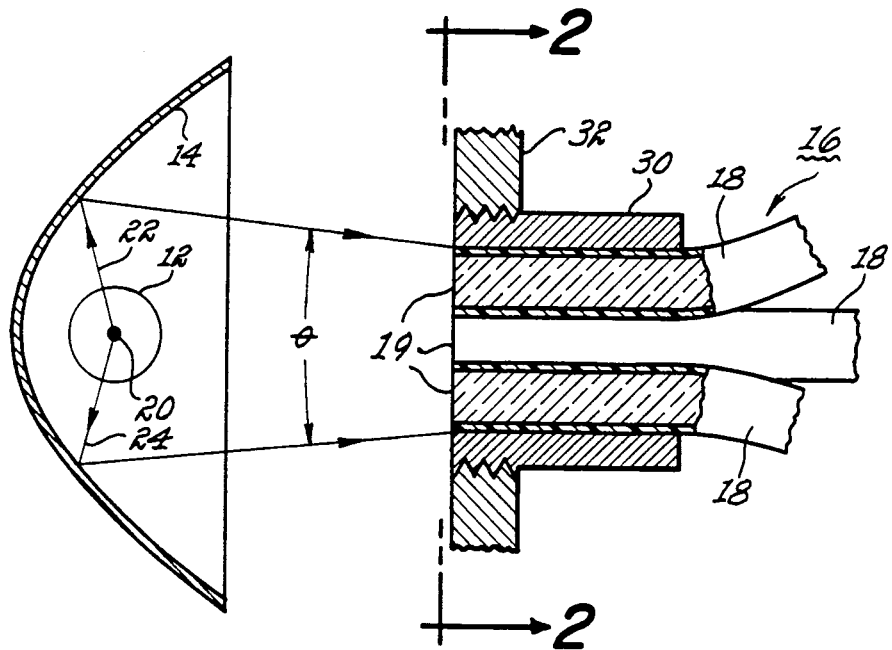
FIG. 1 is a sectional side-elevational view of a prior art lighting subsystem comprising a light source and a bundle of optical fibers for transmitting light from the light source.

Referring first to FIG. 1, the lighting subsystem depicted therein comprises a light source 12, an ellipsoidal reflector 14, and a bundle 16 of optical fibers 18, each having an input end 19 facing the reflector. This subsystem corresponds to that disclosed in the aforesaid U.S. Pat. No. 4,811,172; and, accordingly, the central portion of the light source 12 is located at one focal point 20 of the reflector, and the input end of the bundle 16 is located adjacent the other focal point of the ellipsoidal reflector 14. Most of the light rays emitted by the source 12, such as rays 22 and 24, are intercepted and reflected by the reflector 14 and enter the exposed faces, or input ends, 19 of the optical fibers 18 within the confines of an imaginary truncated cone having its axis colinear with the axis of bundle and having a vertex angle of about 76°.

For coupling the bundle 16 of optical fibers to the light source 12, the subsystem of FIG. 1 utilizes a metal sleeve 30 that surrounds the bundle 16 and is suitably fixed to a housing 32 that surrounds the source 12. In a typical prior art subsystem, such as depicted in FIG. 1, the sleeve 30 has a bore uniform diameter for receiving the bundle 16 without deforming the fibers.

Figure 2:
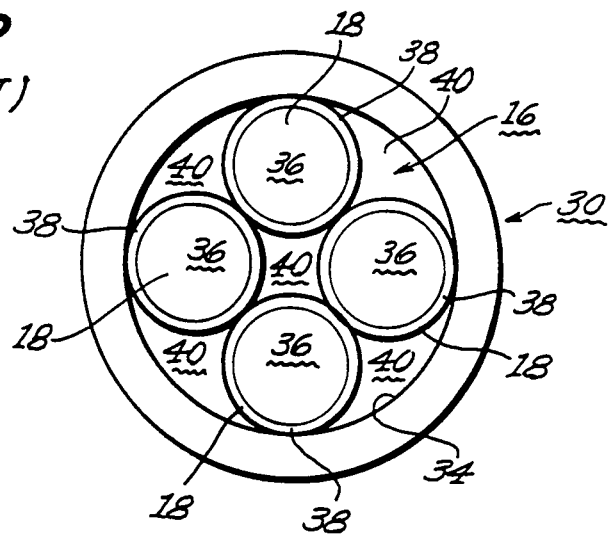
FIG. 2 is an enlarged sectional view along the line 2—2 of FIG. 1.

FIG. 2 is an enlarged cross-sectional view along the line 2—2 of FIG. 1, showing the input end of the optical fiber bundle 16. FIG. 2 also illustrates a typical distribution at the input end of the optical fibers 18 within the bore 34 of sleeve 30. As shown in FIG. 2, each of the optical fibers comprises a core 36 of a light-transmissive material having a relatively high index of refraction and a surrounding coating, or cladding, 38 of a material having a relatively low index of refraction. It will be apparent that in FIG. 2 there are relatively large voids 40 between the optical fibers 18 and also between the optical fibers and bore 34 of the surrounding sleeve 30. The active light-transmitting area within the bore 34 is the total cross-sectional area of the cores 36 or, stated in another way, the cross-sectional area of the bore minus the cross-sectional area of the voids 40, minus the cross-sectional areas of the cladding 38. The light-gathering efficiency of this interface is directly proportional to the ratio of the active light-transmissive area to the total cross-sectional area of the bore. Or stated in another way, the light losses at this interface are inversely proportional to this ratio.

Figure 3:
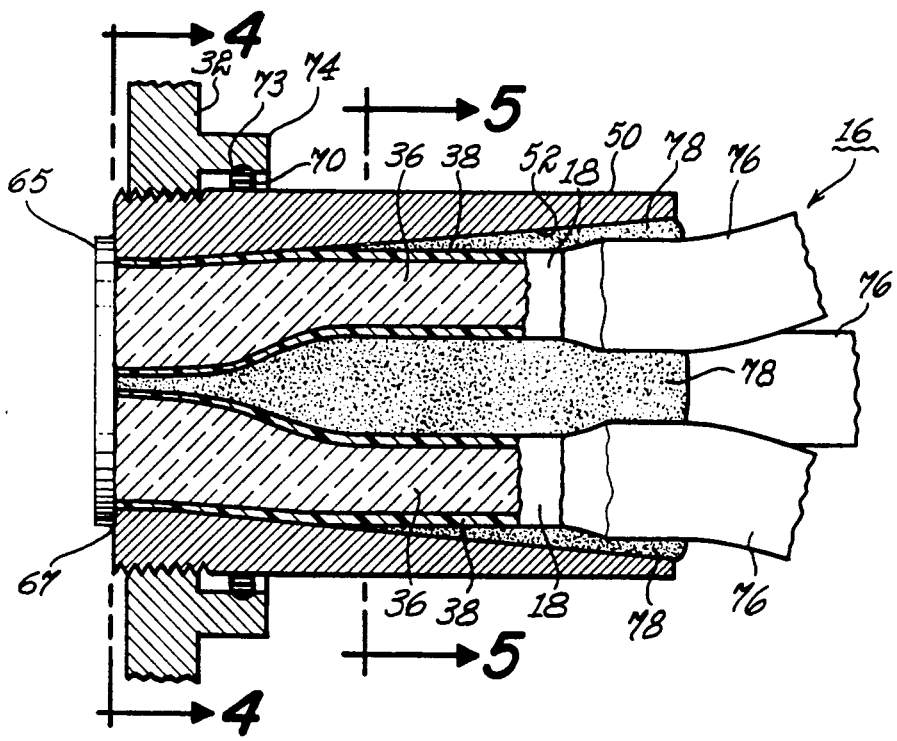
FIG. 3 is an enlarged sectional view of coupling means embodying one form of the present invention for coupling light from a source into the input end of a bundle of optical fibers.
Figures 4, 5:
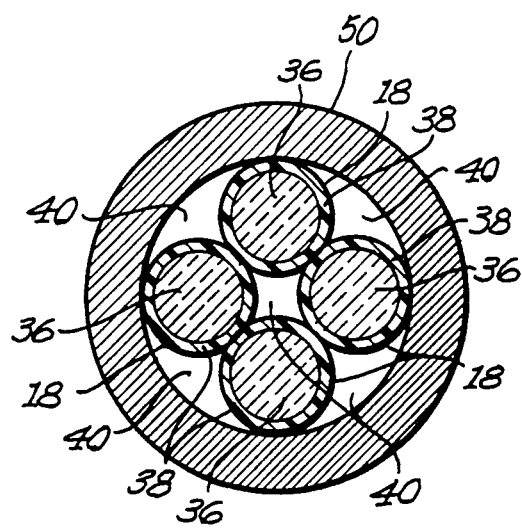
FIG. 4 is a sectional view along the line 4—4 of FIG. 3.
FIG. 5 is a sectional view along the line 5—5 of FIG. 3.

An object of our invention is to increase this light-gathering efficiency and to reduce the losses at this interface. Generally speaking, we accomplish this object by greatly increasing the percentage of the total area at this interface that is occupied by the active light transmissive area of the fibers. As shown in FIGS. 3-5, we effect such an increase by using for the surrounding coupling a sleeve 50 that has a tapered bore 52 of such a size that the sleeve, adjacent its small-diameter or inner end, laterally compresses the optical fibers within the bore and causes the fibers at the exposed end of the bundle (FIG. 4) to deform to such an extent that at this exposed end the cross-sectional area of the voids (40) as a percentage of the total cross-sectional area is greatly reduced as compared to this percentage at the opposite end of the sleeve. More specifically, the optical fibers 18, both core and cladding, are of compression-deformable material, and the above-described compression produced by the surrounding tapered bore 52 causes the fibers to deform in such a way that they more completely fill the bore at the exposed ends of the fibers (i.e., in the plane 4—4 depicted in FIG. 4) than in a transverse plane (such as depicted in FIG. 5) spaced axially outward from plane 4—4, where the fibers are substantially uncompressed and still have their normal uncompressed cross-sectional configuration. FIG. 5 is taken in a plane where the bore 52 has tapered to the smallest diameter that it can be reduced to without compressing the bundle therein. It will be observed that the transverse cross-section of each fiber in the embodiment of FIGS. 3-5 is changed from its substantially circular form in the plane of FIG. 5 to a distinctly non-circular form in the plane of FIG. 4.

It is noted that the material of the fibers is of such a character that the compressive forces developed in the bundle within the sleeve 50 do not substantially change the total cross-sectional area of the light-tranmissive core material of the bundle in any transverse plane. This total cross-sectional area remains substantially the same whether the bundle is uncompressed, as in FIG. 5, or compressed, as in FIG. 4. Accordingly, the compression does not substantially reduce the cross-sectional area of the core available for light transmission.

In the embodiment of FIGS. 3-5, and in all the other embodiments to be described, the optical fibers and their components are designated with the same reference numerals as used for corresponding elements in FIGS. 1 and 2.

Figure 7:
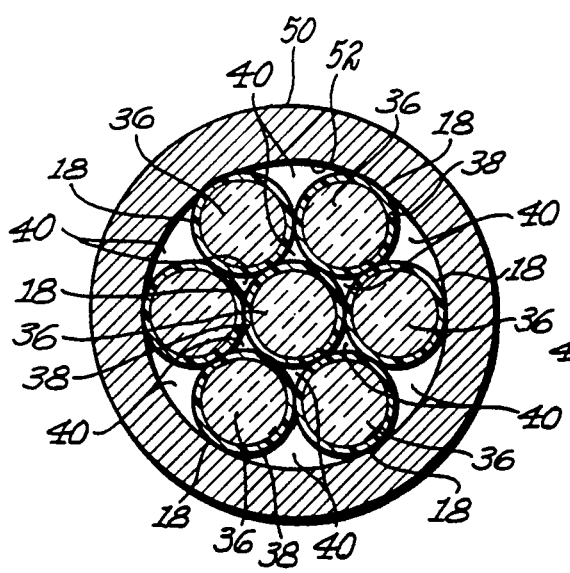
FIG. 7 is a sectional view along the line 7—7 of FIG. 6.
Figure 8:
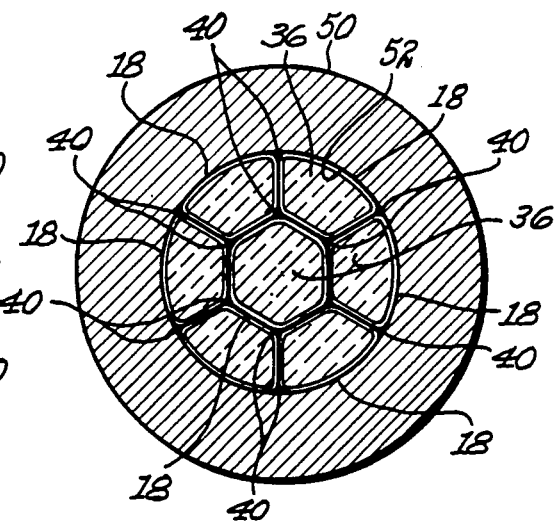
FIG. 8 is a sectional view along the line 8—8 of FIG. 6.

Depending upon the number of fibers and their cross-sectional size, many different packing configurations are possible. As another example, reference may be had to the embodiment of FIGS. 6-8. This embodiment includes a sleeve 50 with a tapered bore 52 of circular transverse cross-sections. FIG. 7 is a sectional view taken along the line 7—7 where the bore 52 has tapered to the smallest diameter possible without compressing the fiber bundle therein. As shown in FIG. 7, the bundle comprises a closely-packed hexagonal array of seven fibers 18 arranged in top and bottom horizontal rows, each of two fibers, and a third horizontal row of three fibers between the top and bottom rows. Voids 40 are present between the fibers and the fibers and the bore 52. By compressing this bundle of fibers radially inward, we deform each fiber into a more or less hexagonal cross-sectional shape with almost no voids between the fibers, as is depicted in FIG. 8. For other numbers and sizes of fibers, the symmetry of the compressed bundle may not be as great as shown in FIG. 8 and some voids will remain, but a substantial improvement in the percentage of the total area filled by active core area will still be obtained by compressing and deforming the fibers essentially as disclosed.

Figure 9:
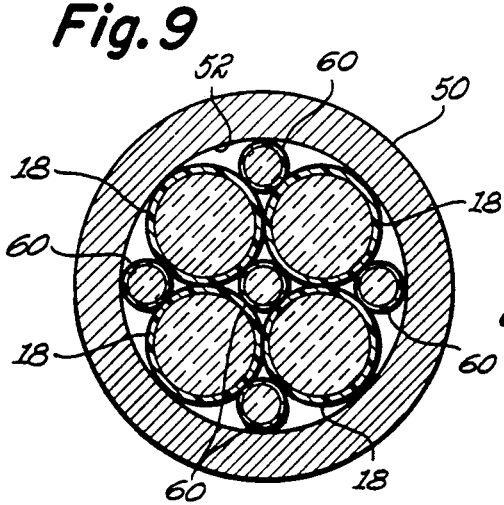
FIG. 9 is a sectional view showing a modified embodiment of the invention including a bundle of optical fibers that includes compression-deformable fibers and also fibers that are not deformed by the compression forces involved.
Figure 10:
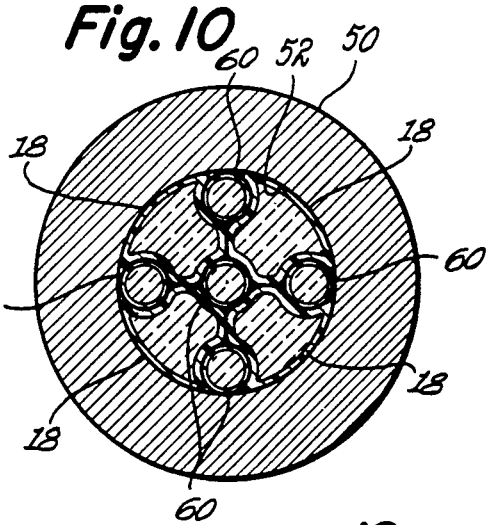
FIG. 10 is a sectional view of the bundle depicted in FIG. 9 taken at the input end of the bundle, where the compression-deformable fibers have been deformed.

While each of the embodiments of FIGS. 3-5 and 6-8 comprises a bundle (16) in which all of the optical fibers (18) are of compression-deformable material, it is to be understood that our invention in its broader aspects comprehends an arrangement in which some of the fibers are of material that is substantially undeformable by the compressive forces involved. For example, in FIGS. 9 and 10, there is shown an array of four optical fibers (18) of a material that is compression-deformable and five optical fibers (60) of a core material, such as acrylic resin, that is substantially undeformed by the compressive stresses applied by the tapered sleeve 50, which corresponds to the tapered sleeve 50 of the first two embodiments. FIG. 9 shows the bundle in a region of the surrounding sleeve 50 where the bundle is in an uncompressed condition. FIG. 10 on the other hand, is a cross-sectional view taken at the small end of the tapered bore 52 of the sleeve, where the bundle is radially compressed and the deformable fibers are severely deformed by such compression. In the region depicted in FIG. 10 the deformed fibers 18 substantially fill the portions of bore that are not occupied by the undeformed fibers 60.

Examples of compression-deformable optical fibers are those sold by Lumenyte International Corp. of Cosa Mesa, Calif. as its "end light" optical fibers and those sold by Fibre Lite Corp., Dallas, Tex. as its END GLOW optical fibers. Examples of fibers that are not compression-deformable under these conditions are those sold by Edmund Scientific Co., Barrington, NJ., as ESKA acrylic optical fibers, manufactured by Mitsubishi Rayon Co.,Ltd.

Another feature of our coupling device is its inclusion of a thin glass or plastic cover 65 (shown in FIG. 3) over the exposed ends of the optical fibers 18. This cover is attached to the exposed ends of the fibers by an optically clear cement 67 that fills any voids between the ends of the fibers and the glass cover. The glass cover 65 is also sealed by this cement to the exposed inner face of the metal sleeve 50 to form a hermetic seal between the glass cover and the sleeve 50. The cement selected for this application has an index of refraction that matches that of the optical fiber core material and also that of cover 65.

To provide a hermetic seal about the entire coupling, an O-ring 70 is provided. When the sleeve 50 is threaded into place in its position of FIG. 3, the O-substantially ring provides a high quality seal about the outer circular periphery of the sleeve. The 0-ring is seated in an annular groove 73 in the internal surface of an outwardly-projecting circular ring 74 integral with the wall 32. It is to be understood that the illustrated seal (70–74) is exemplary of many different types of seals which are suitable for use in this location.

An important function of the taper in the bore 52 is to enable the bundle of fibers (when it is inserted into the large end of the sleeve 50 during assembly of the coupling) to be fed naturally and gradually into its compressed state at the small end of the bore. It is not necessary that the taper extend all the way to the end of the bore, and as a matter of fact, our bore 52 includes a short length near its small end that is of uniform diameter.

It is noted that each fiber includes a protective cover 76 surrounding its core and cladding. This cover, which is of a conventional design, is removed from the end portion of each fiber beginning just beyond the point where the fiber enters the sleeve 50. This cover-removal is carried out in such a way that the cladding 38 remains intact.

At the outer end of the sleeve 50 a suitable cement, preferably a silicone cement shown at 78 in FIG. 3, is applied between the sleeve 50 and the fiber bundle. This cement flows into the voids in this region between the fibers and also into the voids between the fibers and the bore of the sleeve. The cement also flows into the space between the sleeve 50 and the protective covers 76. When the cement cures, it provides a seal at this outer end of the coupling which acts to prevent foreign substances from entering the coupling.

The seal also provides a good mechanical bond between the fibers and the sleeve 50 that precludes the fibers from being easily pulled from the coupling.

The above-described coupling is manufactured by first removing from the inner end of each fiber a section of the surrounding cover 76 while leaving the cladding 38 on the undividual fibers undisturbed, as already noted above. The bundle is then forced axially into the outer end of the sleeve 50, effecting the above-described compression and deformation of the optical fibers at the small end of the bore 52. The bundle is forced in this manner into the bore 52 until a short length of the bundle extends past the inner end of the sleeve 50. This protruding end is then trimmed off smoothly, flush with the inner end of the sleeve 50. Then the transparent window 65 is cemented over the end of the bundle and the inner end of the sleeve.

After the above steps have been completed, the silicone cement 78 is applied to the outer end of the sleeve 50, following which it cures and forms the above described mechanically-strong seal for the coupling.

Certain optical fiber materials that we may wish to utilize are not deformable in the manner described above unless they are at an elevated temperature. Our invention in its broader aspects comprehends heating the end of the bundle to develop the desired elevated temperatures before the bundle is forced into the sleeve 50. Then the bundle is forced into the sleeve 50 as above described to produce the desired deformation of the optical fibers.

Another way of terminating the bundle 16 after it has been forced into sleeve 50, as above described, is to freeze the bundle end with liquid nitrogen or the like and then score-snap it off. Thereafter, the end of the bundle can be polished with abrasives in order to obtain the desired smoothness of the bundle and fiber end faces. Such polishing can also be used after the above-described trimming step.

Still another way of terminating the bundle is to pre-cut each fiber to an appropriate length, then bundle together the ends of the pre-cut fibers, then insert the bundled-together ends into the bore 52, and then adjust the ends for alignment, as by slightly withdrawing any excessively protruding fiber. This technique is especially suitable for the form of FIGS. 9 and 10, which comprises both deformable and non-deformable fibers.

Figure 6:
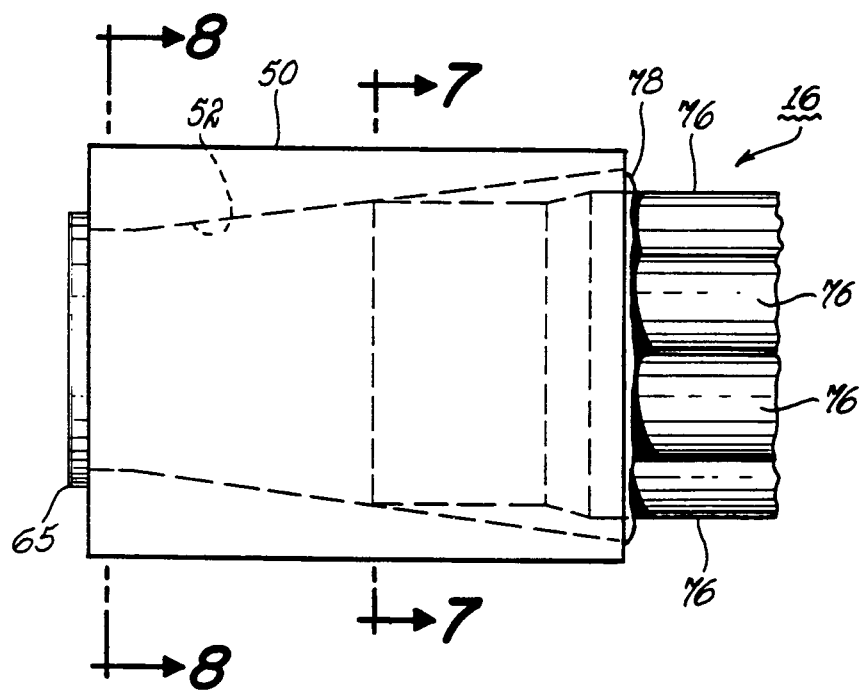
FIG. 6 is a side elevational view showing coupling means embodying a modified form of the invention.
Figure 11:
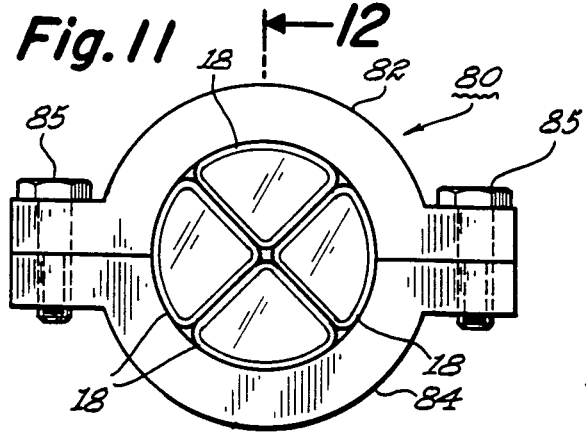
FIG. 11 is a transverse sectional view taken along the line 11—11 of FIG. 12 and showing another modified form of the invention.
Figure 13:
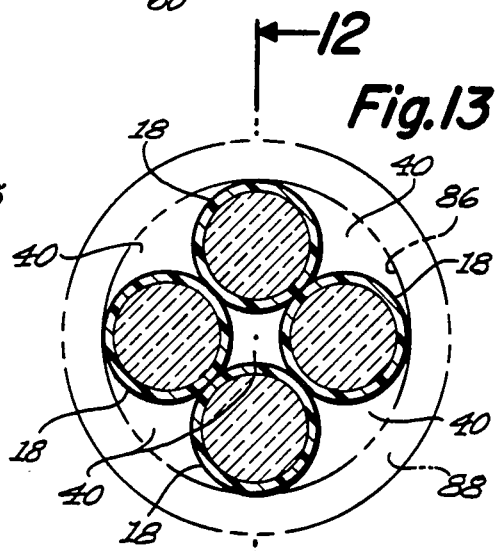
FIG. 13 is a transverse sectional view along the line 13—13 of FIG. 12
Figure 12:
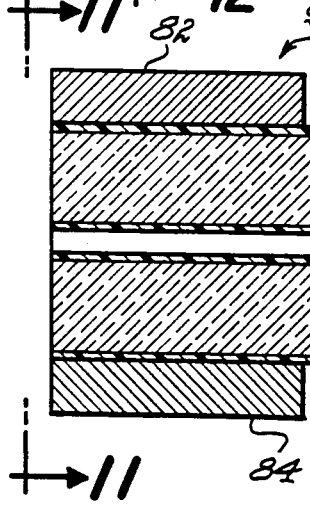
FIG. 12 is a longitudinal sectional view taken along the line 12—12 of FIG. 11 and 12—12 of FIG. 13.

While there are important advantages in using for the coupling a sleeve having a bore that is tapered, as shown in FIGS. 3 and 6, our invention in its broader aspects comprehends a coupling in which a two-part sleeve having a bore of uniform diameter is clamped about the inner end of the fiber bundle in order to produce the desired compression and resultant higher packing fraction. FIGS. 11-13 show such a coupling. In this coupling, there is a sleeve 80 comprising two semicylindrical parts 82 and 84 that are clamped together (as by screws 85, FIG. 11) about the inner end of the fiber bundle 16 to compress the bundle and deform the fibers 18 into the cross-sectional shapes best shown in FIG. The normal uncompressed shape of these fibers in a plane parallel to the plane 11—11 is illustrated in FIG. 13.

FIG. 13 shows a reference circle 86 coinciding with the internal circumference of the circular ring with smallest internal diameter that could surround the bundle in the plane of FIG. 13 without laterally compressing the bundle. This imaginary ring is designated 88.

Comparing FIGS. 11 and 13, it will be apparent that the bore of sleeve 80 has a diameter substantially smaller than the diameter of the reference circle 86 of FIG. 13. As a result of this smaller diameter, the fibers in plane 11—11 more completely fill the bore of the sleeve 80 than they would fill the bore of the imaginary ring 88 if the ring was actually present in the plane 13—13.

In the embodiment of FIGS. 11—13, as well as in the other illustrated embodiments, the smaller diameter of the fiber bundle in the input plane at the left hand end of the coupling sleeve (50 or 80) than in a plane to the right where the bundle is uncompressed can be utilized to provide a better match to the small spot of light from an optical system such as depicted in FIG. 1.

While we have illustrated our invention in connection with a coupling sleeve (50 or 80) that has a bore of substantially circular transverse cross-section, it is to be understood that our invention in its broader aspects comprehends the use of a coupling sleeve in which the passage through the sleeve is non-circular in transverse cross-section, e.g., oval or rectangular.

While in the above-described embodiments we remove only the protective covers (76) on the ends of the optical fibers and leave the cladding (38) in place on these ends, in certain applications we also remove the cladding from the end portions of the fibers located within the tapered bore (52). This removal of the cladding enables us to fill the small diameter end of the sleeve even more completely with active core area, thus further increasing the packing fraction and the resulting light-gathering efficiency at the input end of the coupling.

By way of example and not limitation, typical dimensions for a coupling, e.g., the coupling of FIGS. 3-5, are as follows: the sleeve 50 has an outer diameter of 1 inch and is 2 inches long. The bore 52 has a diameter at its small end of about ½ inch and almost 1 inch as its large end and a taper of about 5 to 15 degrees. The four optical fibers are each 8 mm. in diameter. With sleeves of suitable dimensions, optical fibers of both larger and smaller diameters than the above example can be readily utilized in our coupling means. Typical fibers of larger size are in the 12 to 20 mm. range.

While we have shown and described particular embodiments of our invention, it will be obvious to those skilled in the art that various changes and modifications may be made without departing from the invention in its broader aspects; and we, therefore, intend herein to cover all such changes and modifications as fall within the true spirit and scope of the invention.

What we claim as new and desired to secure by Letters Patent of the United States is:

1. A lighting subsystem comprising:
   (a) a bundle of optical fibers each having an input end for receiving light from a light source, the input ends of said fibers being located substantially in a predetermined plane, said bundle of fibers including a combination of a first group of fibers which are made of non-compression deformable material and a second group of fibers being of compression-deformable material and each of said second group of fibers have a normal transverse cross-section when in an uncompressed state, and
   (b) a coupling device positioned about said bundle adjacent said predetermined plane and comprising a member containing a bore for receiving said bundle, said bore tapering from a relatively large diameter at a location spaced from said predetermined plane to a relatively small diameter at said predetermined plane, said bore in a second plane parallel to and spaced from said predetermined plane having a circumference just large enough to surround said bundle without laterally compressing the fibers in said second plane, and in which:
   (c) said tapered bore is of such a size that the second group of optical fibers therein are laterally compressed and said compression-deformable fibers are so deformed in transverse cross-section relative to their normal transverse cross-sections that the optical fibers more completely fill said bore in the relatively small diameter region of the bore than in said second plane.

2. A lighting subsystem comprising:
   (a) a bundle of optical fibers each having an input end for receiving light from a light source, the input ends of said fibers being located substantially in a predetermined plane, at least some of said fibers being of compression-deformable material and each of said latter fibers being made of non compression deformable material, and
   (b) a coupling device positioned about said bundle adjacent said predetermined plane and comprising a member containing a passage therethrough for receiving said bundle, said passage tapering from a relatively large cross-sectional area at a location spaced from said predetermined plane to a relatively small cross-sectional area at said predetermined plane, said passage in a second plane parallel to and spaced from said predetermined plane having a periphery just large enough to surround said bundle without laterally compressing the fibers in said second plane, and in which:
   (c) said tapered passage is of such a size that the optical fibers therein are laterally compressed and said compression-deformable fibers are so deformed in transverse cross-section relative to their normal transverse cross-sections that the optical fibers more completely fill said passage in the relatively small cross-sectional area region of the passage than in said second plane.

3. The lighting subsystem of claim 2 in which each of said optical fibers comprises a core and cladding surrounding said core, said core and said cladding being of compression-deformable material.

4. The lighting subsystem of claim 2 in which each of said optical fibers comprises a core and cladding surrounding the core, said core and said cladding being of compression-deformable material and extending through said tapered passage.

5. The lighting subsystem of claim 2 in which each of said optical fibers comprises a core and cladding surrounding said core, at least some of said cores being free of said cladding in the relatively small-diameter region of said tapered passage.

6. The lighting subsystem of claim 1 in which the second group of compression-deformable fibers in said predetermined plane more fully envelope said first group of fibers and leaving a much smaller percentage of the bore cross-section void in said predetermined plane than is the case in said second plane.

7. The lighting subsystem of claim 1 in which said bundle has substantially the same total light-transmissive cross-sectional area in said predetermined plane as in said second plane.

8. The lighting subsystem as defined in claim 2 and further comprising a transparent cover for the input end of said bundle and cement attaching said cover to said bundle input end, said cover and cement each having an index of refraction substantially matching that of the light transmissive core material of said optical fibers.

9. The lighting subsystem as defined in claim 1 in which:
   (a) said bore-containing member has an end opposite to said predetermined plane through which said optical fibers enter said bore, and
   (b) adhesive is provided within said bore at said opposite end for bonding said fibers to said bore and to each other and for providing a seal at said opposite end for blocking the entry of foreign material into said bore.

10. The lighting subsystem of claim 1 in which said bundle includes fibers that are relatively undeformed by the compressive forces developed within said coupling device, the compression-deformable fibers in said predetermined plane more fully enveloping the relatively undeformed fibers and leaving a much smaller percentage of the passage cross-section void in said predetermined plane than is the case in said second plane.

11. A lighting subsystem comprising:
(a) a bundle of optical fibers each having an input end for receiving light from a light source, the input ends of said fibers being located substantially in a predetermined plane, at least some of said fibers being of compression-deformable material and each of said latter fibers being made of non compression deformable material, and
(b) a coupling device positioned about said bundle adjacent said predetermined plane and comprising a member containing a passage for receiving said bundle, and in which:
(c) said bundle, considered in a second plane parallel to said predetermined plane and located where the bundle is laterally uncompressed, is enclosable by a reference circle having a cross-sectional area equal to the internal cross-sectional area of the smallest circular ring that could surround said bundle in said second plane without laterally compressing said bundle, and
(d) said passage has a cross-section area in said predetermined plane which is substantially smaller than the cross-sectional area of said reference circle, thus causing the optical fibers at said predetermined plane to be laterally compressed and so deformed in transverse cross-section relative to their normal transverse cross-sections that the optical fibers more completely fill said passage in said predetermined plane than they would fill the passage of said ring if the ring enclosed said bundle in said second plane.

12. A method of making a coupling for the input end of a bundle of optical fibers that are adapted to transmit light received through said input end, the method comprising: (a) at least some of said bundle of optical fibers each comprising a group of fibers made of compression deformable material and a group of fibers made of non compression deformable material,
(b) providing a sleeve having a passage that is tapered so that the passage has a relatively large cross-sectional area at one end of the sleeve and a relatively small cross-sectional area at the opposite end of the sleeve,
(c) inserting a leading end of said bundle of fibers into the end of said sleeve containing the large cross-sectional area passage,
(d) forcing said leading end of the bundle to move relative to said sleeve so that said leading end passes axially along said tapered passage to said opposite end of said sleeve, and
(e) laterally compressing said bundle adjacent said leading end as the leading end is passed along said tapered passage to such an extent that the optical fibers at the small cross-sectional area end of said passage are deformed in such a manner that they more completely fill the passage at said small cross-sectional area end than they fill the passage in the smallest cross-sectional region of the passage where there is no lateral compression of the bundle.

13. A method as defined in claim 12 and further comprising causing said leading end of the bundle to emerge from said sleeve at said opposite end of the sleeve, removing said leading end of the bundle where it has emerged from said sleeve, and providing a smooth surface on the end of the bundle that remains after said leading end is removed.

14. A method as defined in claim 12 and further comprising the step of providing an adhesive between said optical fibers and said sleeve at the large cross-sectional area passage end of the sleeve that anchors the fibers to said sleeve.

15. A method as defined in claim 12 and further comprising attaching a transparent cover to said input end of the bundle by providing between said cover and said input end cement that has an index of refraction substantially matching that of the optical fiber core.

16. A method as defined in claim 12 in which:
(a) some of the optical fibers of said bundle are of a material that is relatively undeformed by the compressive forces developed within said sleeve, and
(b) said compression-deformable fibers are caused by lateral compression of said bundle at the small cross-sectional area end of said passage to more fully envelope the relatively undeformed fibers and leave a much smaller percentage of the passage cross-section void in said small cross-sectional area end of the passage than in the smallest cross-sectional area portion of the passage where there is no lateral compression of the bundle.

17. The lighting subsystem of claim 2 in which each of said compression-deformable fibers has a substantially circular transverse cross-section in its uncompressed state and a distinctly non-circular transverse cross-section in the relatively small cross-sectional area region of the passage.

* * * * *